(12) United States Patent
Kocer et al.

(10) Patent No.: US 8,868,300 B2
(45) Date of Patent: Oct. 21, 2014

(54) MULTI-VARIABLE RATE AGRICULTURAL PRODUCT APPLICATION SYSTEM, DEVICE AND METHOD

(75) Inventors: Jared E. Kocer, Sioux Falls, SD (US); Jesse L. Wagers, Sioux Falls, SD (US); Charlie R. Schoenfelder, Sioux Falls, SD (US); Brent Bast, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 510 days.

(21) Appl. No.: 12/815,956

(22) Filed: Jun. 15, 2010

(65) Prior Publication Data

US 2011/0054743 A1    Mar. 3, 2011

Related U.S. Application Data

(60) Provisional application No. 61/237,851, filed on Aug. 28, 2009.

(51) Int. Cl.
*B62D 49/00* (2006.01)
*A01C 7/06* (2006.01)
*A01C 7/10* (2006.01)
*A01B 79/00* (2006.01)

(52) U.S. Cl.
CPC . *A01C 7/102* (2013.01); *A01C 7/06* (2013.01); *A01B 79/005* (2013.01)
USPC ............. 701/50; 700/241; 700/243; 700/283; 111/127; 111/177; 111/178

(58) Field of Classification Search
CPC ...... B62D 49/00; A01B 9/005; A01B 69/008; A01B 63/00; A01M 7/0089; A01M 7/0092; A01M 9/0092; A01C 21/005; A01C 7/105; A01C 23/007; A01C 23/047; A01C 7/102; A01C 7/04; A01C 7/046; A01C 7/08; A01C 7/081
USPC ............ 701/50; 700/241, 243, 283; 111/127, 111/177, 178
See application file for complete search history.

(56) References Cited

U.S. PATENT DOCUMENTS 3,980,230 A * 9/1976 Pringle et al. ................... 239/61
4,230,280 A    10/1980 Leigh et al.
(Continued)

FOREIGN PATENT DOCUMENTS

CN    102480913 A    5/2012

OTHER PUBLICATIONS

International Search Report from PCT/US2010/041659, mailed Aug. 31, 2010.

(Continued)

*Primary Examiner* — James R Olszewski
*Assistant Examiner* — Truc M Do
(74) *Attorney, Agent, or Firm* — Schwegman Lundberg & Woessner, P.A.

(57) ABSTRACT

The invention provides a system, device and method that can control the rates of seed dispensation and fertilizer application as a function of forward speed as well as across all rows. Thus, the system and control device allow control of each individual row unit, whereby dispensation and application are effected, by a central controller which controls a plurality of pulse width modulation valves, each of which controls a hydraulic motor with an integrated rpm reduction and which drives a stub drive shaft which rotates at the proper speed in order to provide the desired seed and fertilizer metering. Each of the stub drive shafts may rotate at completely different speeds and/or may be shut down while the remaining stub drive shafts rotate at the desired speed. The integrated rpm reduction within each hydraulic motor allows very fine rotational control of the dispensation and application rates.

21 Claims, 4 Drawing Sheets

(56) References Cited

U.S. PATENT DOCUMENTS

| | | | |
|---|---|---|---|
| 5,337,959 A | 8/1994 | Boyd | |
| 5,574,657 A * | 11/1996 | Tofte et al. | 700/283 |
| 5,635,911 A | 6/1997 | Landers et al. | |
| 5,704,546 A | 1/1998 | Henderson et al. | |
| 5,772,114 A | 6/1998 | Hunter | |
| 5,801,948 A | 9/1998 | Wood | |
| 5,864,781 A | 1/1999 | White | |
| 5,883,383 A | 3/1999 | Dragne | |
| 5,884,205 A | 3/1999 | Elmore et al. | |
| 5,884,224 A | 3/1999 | McNabb et al. | |
| 5,897,600 A | 4/1999 | Elmore et al. | |
| 5,911,362 A | 6/1999 | Wood et al. | |
| 5,913,915 A | 6/1999 | McQuinn | |
| 5,919,242 A | 7/1999 | Greatline et al. | |
| 5,936,234 A | 8/1999 | Thomas et al. | |
| 5,938,071 A | 8/1999 | Sauder | |
| 5,969,340 A | 10/1999 | Dragne et al. | |
| 5,971,294 A | 10/1999 | Thompson et al. | |
| 5,978,723 A | 11/1999 | Hale et al. | |
| 6,070,538 A | 6/2000 | Flamme et al. | |
| 6,070,539 A * | 6/2000 | Flamme et al. | 111/177 |
| 6,079,340 A * | 6/2000 | Flamme et al. | 111/178 |
| 6,093,926 A | 7/2000 | Mertins et al. | |
| 6,122,581 A | 9/2000 | McQuinn | |
| 6,189,807 B1 | 2/2001 | Miller et al. | |
| 6,199,000 B1 | 3/2001 | Keller et al. | |
| 6,216,614 B1 | 4/2001 | Wollenhaupt | |
| 6,230,091 B1 * | 5/2001 | McQuinn | 701/50 |
| 6,236,924 B1 | 5/2001 | Motz et al. | |
| 6,373,057 B1 | 4/2002 | Penfold | |
| 6,510,367 B1 * | 1/2003 | McQuinn | 700/241 |
| 6,522,948 B1 * | 2/2003 | Benneweis | 700/243 |
| 6,606,542 B2 | 8/2003 | Hauwiller et al. | |
| 6,661,514 B1 | 12/2003 | Tevs et al. | |
| 6,678,580 B2 * | 1/2004 | Benneweis | 700/237 |
| 6,698,368 B2 | 3/2004 | Cresswell | |
| 6,708,080 B2 | 3/2004 | Benneweis | |
| 6,776,355 B2 | 8/2004 | Ringer et al. | |
| 6,877,675 B2 * | 4/2005 | Benneweis | 239/63 |
| 7,152,540 B1 | 12/2006 | Sauder et al. | |
| 7,395,769 B2 | 7/2008 | Jensen | |
| 7,472,660 B2 | 1/2009 | Mariman et al. | |
| 7,478,603 B2 | 1/2009 | Riewerts et al. | |
| 7,690,440 B2 | 4/2010 | Dean et al. | |
| 7,694,638 B1 | 4/2010 | Riewerts et al. | |
| 7,706,926 B2 | 4/2010 | Peterson | |
| 7,742,842 B2 * | 6/2010 | Giles et al. | 700/283 |
| 7,775,167 B2 * | 8/2010 | Stehling et al. | 111/69 |
| 7,826,930 B2 * | 11/2010 | Giles et al. | 700/283 |
| 7,848,865 B2 | 12/2010 | Di Federico et al. | |
| 7,896,258 B2 * | 3/2011 | Hoisington et al. | 239/155 |
| 8,001,914 B2 * | 8/2011 | Peterson et al. | 111/175 |
| 8,078,367 B2 | 12/2011 | Sauder et al. | |
| 8,141,504 B2 | 3/2012 | Dean et al. | |
| 8,170,825 B2 | 5/2012 | Beaujot et al. | |
| 8,186,288 B2 | 5/2012 | Chinkiwsky | |
| 8,191,795 B2 * | 6/2012 | Grimm et al. | 239/1 |
| 8,191,798 B2 | 6/2012 | Hahn et al. | |
| 8,488,874 B2 | 7/2013 | Zaman et al. | |
| 8,601,962 B2 * | 12/2013 | Kowalchuk et al. | 111/178 |
| 8,635,963 B2 | 1/2014 | Friggstad | |
| 2002/0107609 A1 | 8/2002 | Benneweis | |
| 2002/0178981 A1 * | 12/2002 | Drummond et al. | 111/903 |
| 2003/0070597 A1 | 4/2003 | Cresswell | |
| 2004/0244659 A1 * | 12/2004 | Mayerle et al. | 111/174 |
| 2010/0101469 A1 | 4/2010 | Landphair et al. | |
| 2010/0192821 A1 * | 8/2010 | Garner et al. | 111/130 |
| 2011/0139051 A1 * | 6/2011 | Moszoro et al. | 111/174 |
| 2011/0179984 A1 | 7/2011 | Beaujot et al. | |
| 2012/0169495 A1 | 7/2012 | Kowalchuk | |
| 2012/0174843 A1 | 7/2012 | Friggstad | |
| 2012/0195496 A1 | 8/2012 | Zaman et al. | |
| 2012/0211508 A1 | 8/2012 | Barsi et al. | |

OTHER PUBLICATIONS

European Application Serial No. 10812458.7, Extended European Search Report mailed Jan. 2, 2013, 4 pgs.

International Application Serial No. PCT/US2010/041659, International Preliminary Report on Patentability mailed Mar. 8, 2012, 7 pgs.

International Application Serial No. PCT/US2010/041659, International Search Report mailed Aug. 31, 2010, 2 pgs.

European Application Serial No. 10812458.7, Office Action mailed Apr. 13, 2012, 2 pgs.

European Application Serial No. 10812458.7, Office Action mailed Dec. 8, 2013, 1 pg.

European Application Serial No. 10812458.7, Response filed Aug. 19, 2013 to Extended European Search Report mailed Jan. 22, 2013, 17 pgs.

European Application Serial No. 10812458.7, Response filed Oct. 23, 2012 to Office Action mailed Apr. 13, 2012, 4 pgs.

South African Application Serial No. 2012/02193, Voluntary Amendment filed Nov. 16, 2012, 9 pgs.

Chinese Application Serial No. 201080031364.6, Office Action mailed Jan. 6, 2014, 7 pgs.

* cited by examiner

MULTI-VARIABLE RATE AGRICULTURAL PRODUCT APPLICATION SYSTEM, DEVICE AND METHOD

CROSS-REFERENCE TO RELATED APPLICATION(S)

The present application claims priority to provisional application No. 61/237,851, filed on Aug. 28, 2009, the entire contents of which are incorporated herein by reference.

BACKGROUND OF THE INVENTION

1. Field of the Invention

The invention relates to systems, devices and methods for controlling the rate of dispensation and/or application of an agricultural product across individual rows of a farm implement.

2. Description of the Related Art

Conventional agricultural planters and sprayers distribute agricultural products such as seed and/or liquid and/or granular fertilizer from storage containers, e.g., separate hoppers or storage container, through a metering device for delivery. Seed and fertilizer drop to the ground into a furrow creating rows.

In particular, some conventional systems for seeding and fertilizing comprise using rotational power to drive a fan which creates a vacuum for trapping seeds on a perforated disk that is rotated through a mechanical apparatus, including gear reductions, so that the speed of the rotation of the perforated disk is coordinated with the forward speed of the prime mover or tractor Other types of planters are mechanically driven by a chain drive mechanism connected to a drive wheel that defines the rate of forward motion of the planter. Changing application rate of this rate-specific solution requires changing the size of the sprockets; not a desirable alternative.

Still other devices utilize a controller which controls a hydraulic motor which in turn drivingly rotates a single transverse shaft. See, e.g., FIG. 2, which is discussed in further detail infra. This single transverse rotating shaft results in control of seed dispensation and fertilizer application as a function of forward speed, but the rates of dispensation and application are equivalent across all rows.

Still other devices use a control mechanism which controls rates of dispensation and application for individual sections, i.e., the right or left side, of the multi-row agriculture implement independently, but does not allow individual row unit control. Thus, control of each half of the agricultural implement is possible with these devices, but finer control is not possible.

Individual row clutches may be used to shut off individual rows and/or may be used in conjunction with variable rate drive motors. Such systems are, however driven by hydraulic motors and, as will be discussed further infra, are limited by the hydraulic capacity of modern tractors.

The present invention overcomes these deficiencies.

BRIEF SUMMARY OF THE INVENTION

The invention provides a system, device and method that can control the rates of seed dispensation and fertilizer application as a function of forward speed as well as across all rows (e.g., an agricultural product metering assembly). Thus, the system and control device allow control of each individual row unit, whereby dispensation and application are effected (metering of agricultural products), by a central controller which controls a plurality of pulse width modulation valves, each of which controls a hydraulic motor with an integrated rpm reduction and which drives a stub drive shaft which rotates at the proper speed in order to provide the desired seed and fertilizer metering. Each of the stub drive shafts may rotate at completely different speeds and/or may be shut down while the remaining stub drive shafts rotate at the desired speed. The integrated rpm reduction within each hydraulic motor allows very fine rotational control of the dispensation and application rates. That is to say, the agricultural product metering assembly that includes the integrated rpm reduction within each hydraulic motor allows for very fine control of metering (including dispensation and application rates).

An object of the present invention is to provide a system, device and method for automatically controlling the dispensing of seeds and applying of fertilizer at accurate rates across all rows.

Another object of the present invention is to provide a system, device and method for monitoring the forward speed of the individual row units and automatically controlling dispensing of seeds and applying of fertilizer therethrough at accurate rates across all rows.

Another object of the present invention is to provide a system, device and method which uses computerized mapping and/or GPS monitored row unit positions in order to automatically control dispensing of seeds and applying of fertilizer therethrough at accurate rates across all rows.

The figures and the detailed description which follow more particularly exemplify these and other embodiments of the invention.

BRIEF DESCRIPTION OF THE DRAWINGS

The invention may be more completely understood in consideration of the following detailed description of various embodiments of the invention in connection with the accompanying drawings, which are as follows.

DETAILED DESCRIPTION OF THE INVENTION, INCLUDING THE BEST MODE

Figure 1:
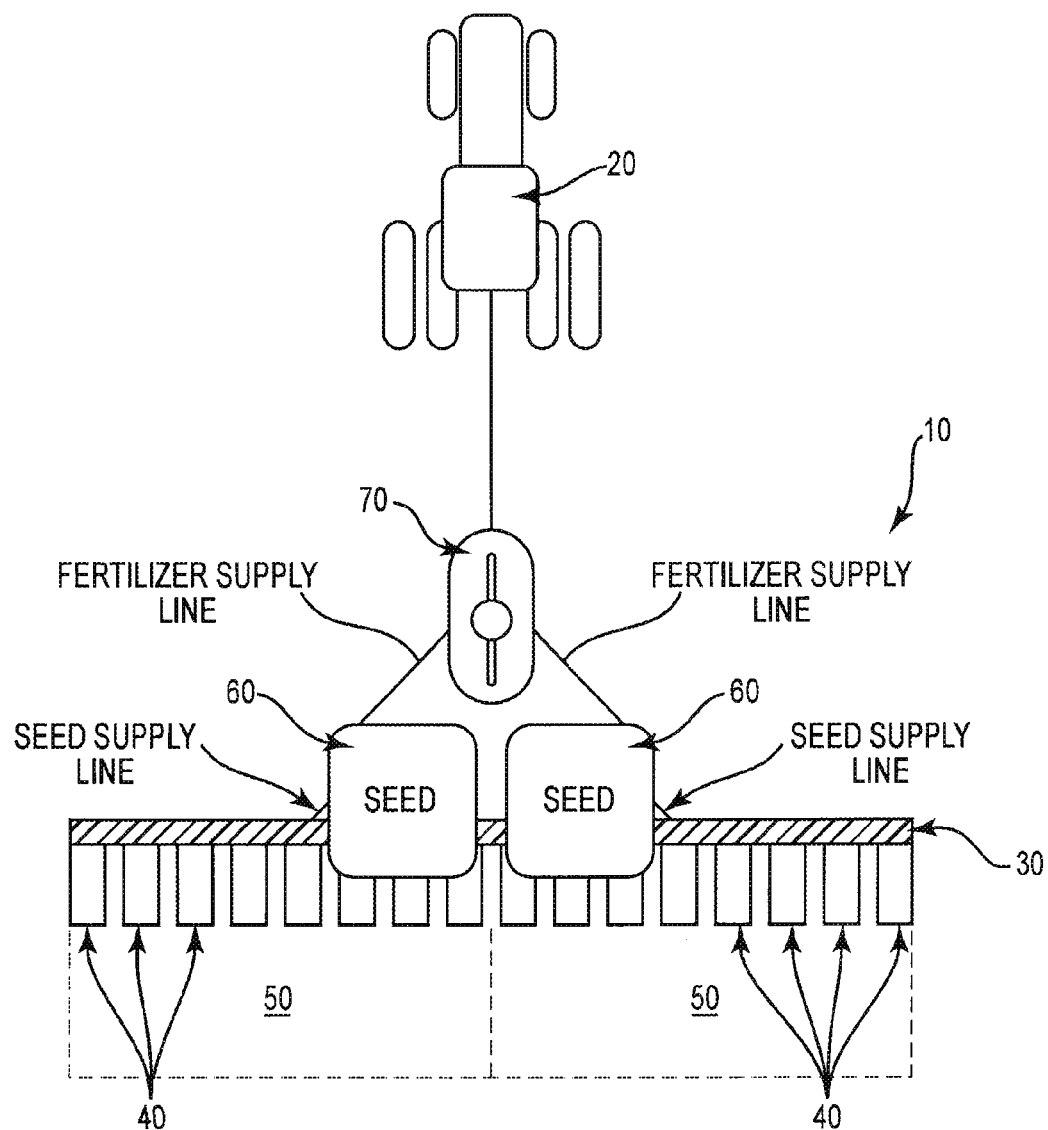
FIG. 1 is a top view of a conventional agricultural planter system.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

FIG. 1 illustrates one embodiment of a conventional planter. This known planter comprises a planter implement 10 which is urged forward by a prime mover 20, usually a tractor. The planter implement typically comprises a toolbar 30 upon which a plurality of row units 40 are mounted. The row units 40 may be grouped into two sections 50, which generally comprise a right and left side or the two halves of the row units 40. Seed may be stored within one or more seed storage containers 60 and, if fertilizer is used, it may be stored within a fertilizer container 70. The seed storage containers 60 and the fertilizer container 70 are in operative communication with the individual row units 40 via supply lines.

Figure 2:
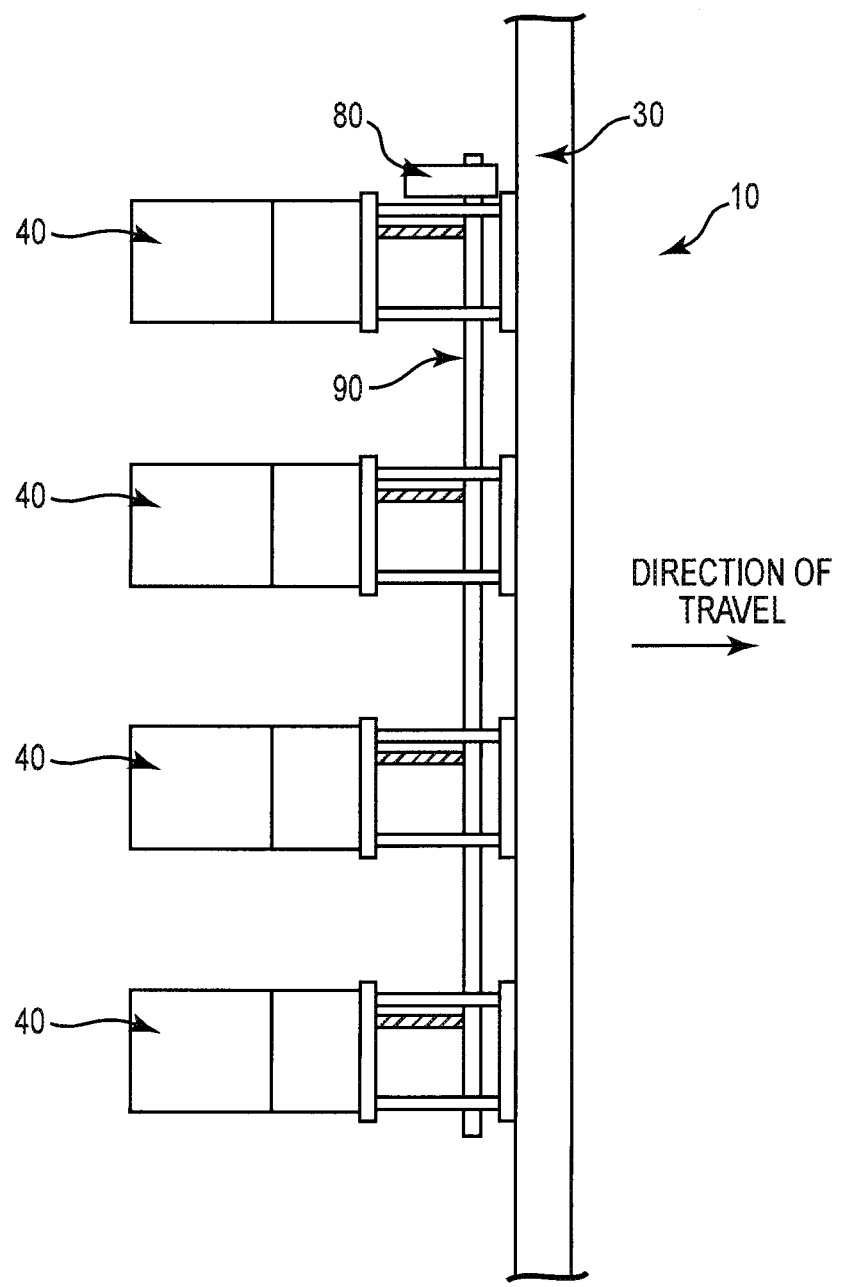
FIG. 2 is a top partial cutaway of a conventional agricultural planter system.

FIG. 2 illustrates a cutaway of the known planter implement 10 of FIG. 1 wherein individual row units 40 are mounted on the toolbar 30. A single hydraulic motor 80 is shown as driving all row units 40 by controlling the rotational speed of a common drive shaft 90. As a consequence, all row units 40 will experience the same rotational speed generated by the single hydraulic motor 80 and common drive shaft 90 and, therefore, all row units 40 will dispense seed and/or apply fertilizer at the same rate; there is no row-to-row compensation or change in dispensation or application rate.

Figure 3:
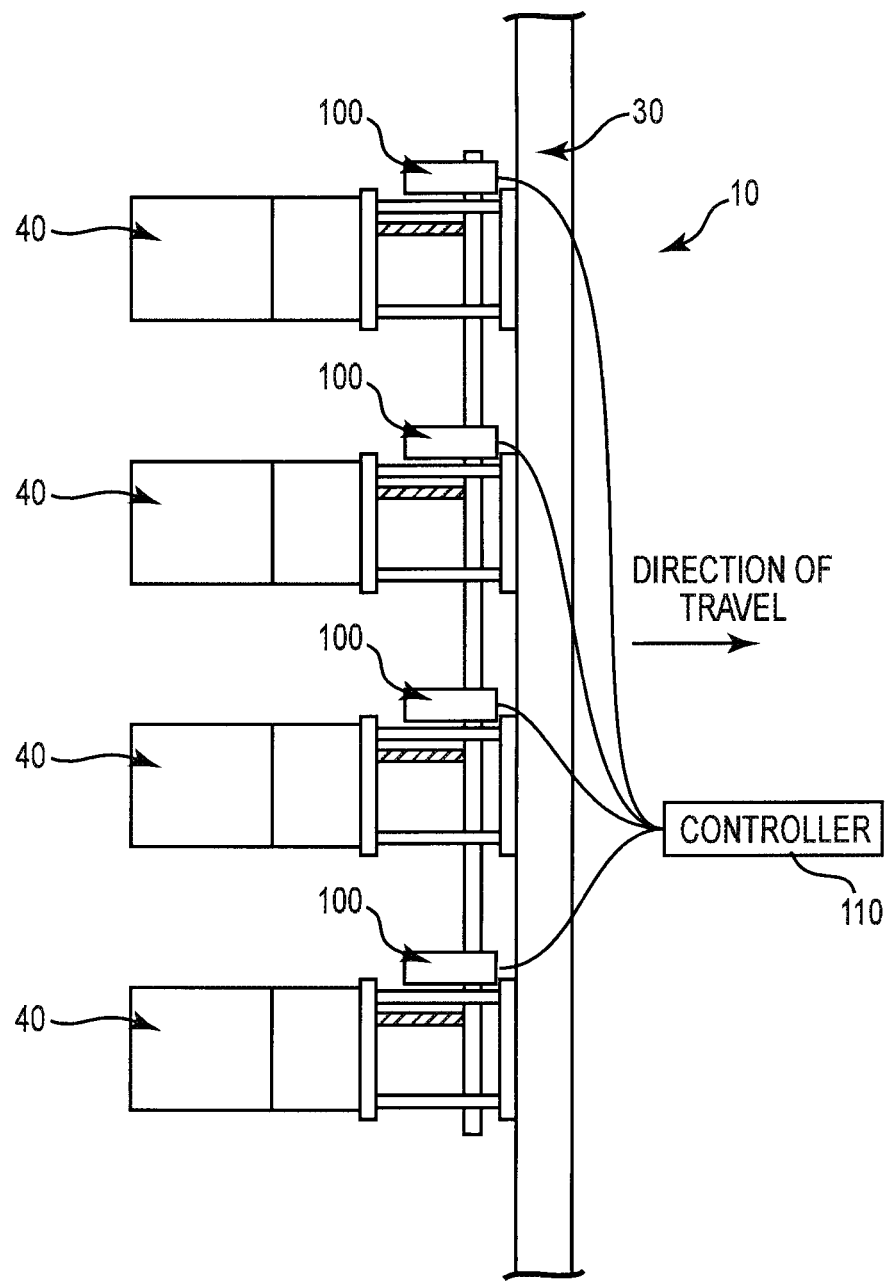
FIG. 3 is a top partial cutaway of one embodiment of the present invention.

Turning now to FIG. 3, a partial cutaway top view of one embodiment of the present invention is shown (e.g., an agricultural product metering assembly). Individual row units 40 are mounted on the toolbar 30 which is, in turn, attached to a prime mover 20 as shown in FIG. 1. However, in contrast with the known planter of FIGS. 1 and 2, each row unit 40 of the present invention is driven by its own modular drive system comprising a hydraulic motor 100 which comprises an integrated rpm reducer therein. This integrated rpm reducer has a very significant effect and allows the use of hydraulic motor 100 on individual row units in a way not previously seen. The reduction of rpm's from the hydraulic motor 100 is necessary for several reasons. The first is that currently, hydraulic motors are used to drive a minimum of six rows, or a section, on current planters. This is due to excessive torque ratings and rpm speed ranges that are simply too high to drive less than a section of rows. Another reason hydraulic motors are not used on individual row units, as is achieved by the present invention, is due to the excessively large amount of hydraulic flow that is required by a system that uses more than a few, e.g., 2-4 remote hydraulic motors; far more flow than a conventional prime mover or tractor can possibly supply. Present planter drive motor technology utilizes motors requiring 4 to 10 GPM per motor. This flow combined with the hydraulic flow requirements of vacuum fans, row marker cylinders, and raise/lower cylinders can tax most modern day tractors. For example, present high end tractors having optional flow capacities that may reach as high as 78 gpm of hydraulic flow which serves up to 6 remote hydraulic valves. However, most modern tractors may have flow rates that are significantly lower, on the order of about 40 to 50 gpm of hydraulic flow capacity and which are typically used with planters having 4-5 remote hydraulic valves. Applicant is unaware of any current hydraulic motors used on planter drives having flow requirements that than 4 gpm.

In stark contrast, the integrated rpm reducer for hydraulic motor 100 of the present invention allows for less than 1 gpm of hydraulic flow which, in turn, allows hydraulic motors 100 to be connected with individual row units 40 while providing a very fine degree of control. Preferably, each hydraulic motor 100 of the present invention provides a hydraulic flow of between about 0.5 gpm and about 1 gpm of hydraulic flow. Thus, the hydraulic motor 100 of the present invention provides a hydraulic flow that is magnitudes less than those currently used to control planters.

Accordingly, each individual hydraulic motor 100 is operatively connected with and controlled by a central controller 110 and further comprises a rotating stub drive shaft 110 operatively connected to the output of the hydraulic motor 100. Ultimately, the rotational speed of the stub drive shaft 110 dictates the rates of seed dispensation and/or liquid fertilizer application and/or granular fertilizer dispensation and each individual row unit 40 is separately controlled so that each individual row unit 40 may experience different rates of seed dispensation and/or fertilizer application at any given time.

Figure 4:
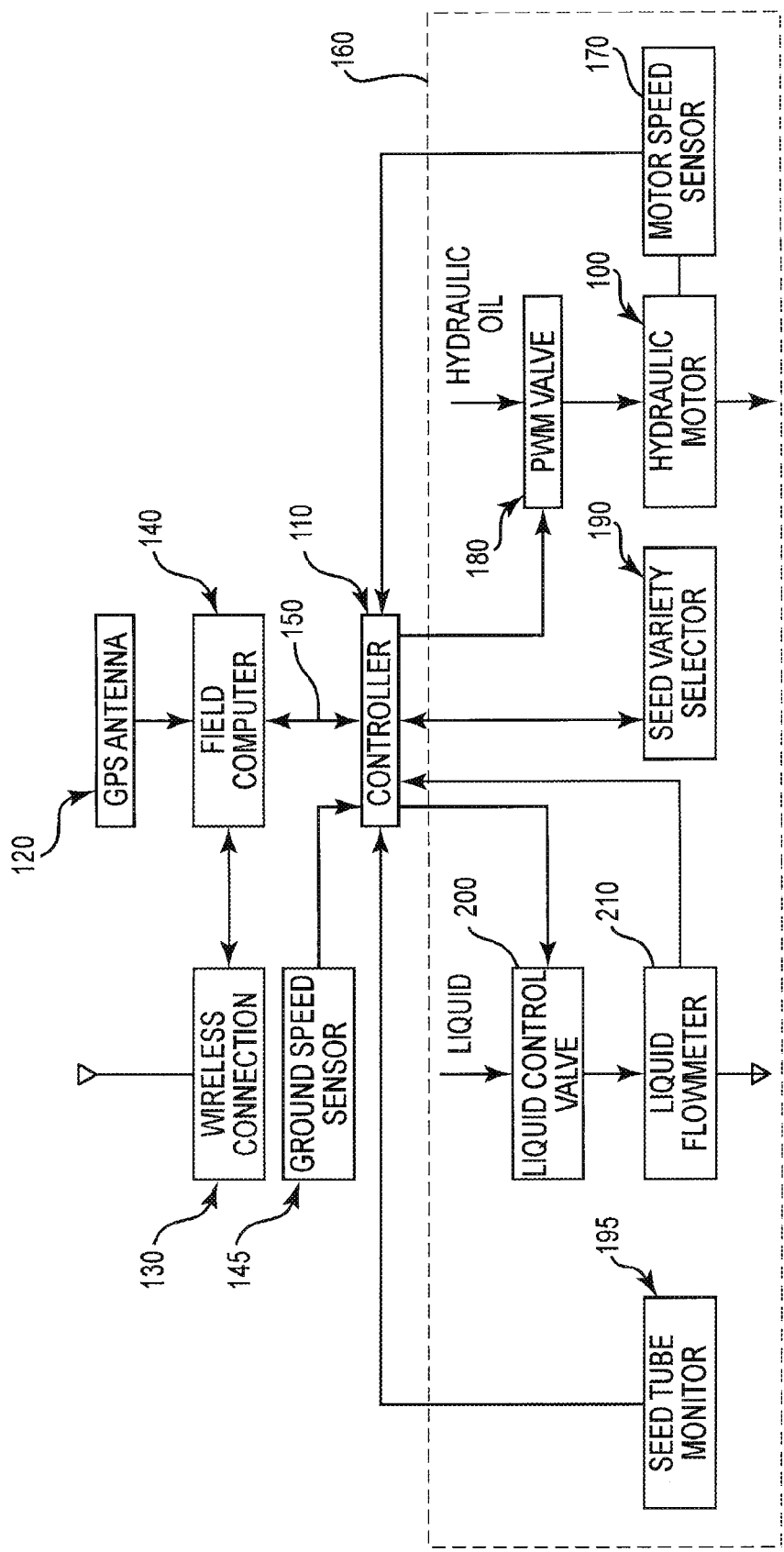
FIG. 4 is a schematic of one embodiment of the present invention.

One embodiment of a system and device of the present invention is schematically illustrated in FIG. 4 (e.g., an agricultural product metering assembly). The control device and system shown receives the latitude and longitude coordinates of the planter implement 10 via a Global Navigation Satellite Systems (GPS) antenna 120 as is well known in the art. This information, along with a Real Time Kinematic (RTK) vehicle correction signal delivered via a wireless data connection 130 as is also well known in the art, to a field computer 140. The field computer 140 accepts the corrected GPS information, ground speed obtained using ground speed sensors 145 as are well known in the art, user system settings and a computerized prescription map of the field as is also well known in the art in order to control the rate of seed dispensation and liquid fertilizer application. Field computer 140 produces a control signal 150 which is transferred to the central controller 110. The central controller then distributes the necessary commands to each of a plurality of row unit control mechanisms 160.

Each row unit control mechanism 160 ultimately controls the seed dispensation and liquid fertilizer application or granular fertilizer dispensation rates for a particular row unit 40. Thus, row unit control mechanism 160 comprises a hydraulic motor control valve, preferably a pulse width modulation valve 180 which is in operative communication with the controller 110 and the hydraulic motor 100 with integrated rpm reducer 100. The controller 110 sends a rotational speed command to the pulse modulation width valve 180 which, in turn, modulates and regulates the valve's current and ultimately controls the rotational speed of hydraulic motor 100. A speed sensor 170 is operatively connected with the hydraulic motor 40 and communicates the rotational speed of the hydraulic motor's 40 to the controller 110. If multiple seed types are employed, controller 110 is also in operative communication with a seed variety selector 190 as is commonly known in the art. In addition, a seed tube monitor 195 may be in operative communication with controller 110.

Each individual row unit control mechanism 160 may further comprise a liquid control valve 200 which is in fluid communication with the fertilizer container 70 and with a flowmeter 210, the liquid control valve 200 and flowmeter 210 being in further operative communication with controller 110 to allow commands therefrom to either increase or decrease fluid flow.

Accordingly, the present invention may be utilized to increase, decrease or shut off completely the rates of dispensation of seeds and/or granular fertilizer and/or application of liquid fertilizer for individual row units 40. This is significant in order to prevent overlap of dispensation or application as well adjusting individual row units dispensation or application rates depending on the field circumstances. For example, a pre-programmed computerized map and/or RTK corrected GPS coordinates may be used to indicate certain regions of a field that are not to be seeded. When row units of the present invention pass over such regions, the present invention functions to shut off the relevant row units. Similarly, if the agricultural implement's path takes one or more row units over a region of a field already seeded and fertilized, the present invention functions to shut off the relevant row units 40. Further, if the agricultural implement moves in a curvilinear path, the row unit 40 on the inner radius of the curve have a slower ground speed than the row unit 40 on the outer radius of the curve, while the row units 40 therebetween have increasingly faster ground speeds the closer their position to the outer radius of the curve. The present invention functions to individually decrease or increase rates of dispensation and/or application to each row unit 40 to accommodate such a curvilinear path. Moreover, as the skilled artisan will readily recognize, the use of GPS in combination with pre-programmed computerized mapping of a field allows customization of the dispensation and/or application of an agricultural product. The present invention achieves this customization through individual control of row units as described here.

Each individual row unit 40 may comprise the following dispensation and/or application units as is well known in the art: seeding element, fertilizing element, spraying element, and/or chemical application element. Thus, the agricultural product(s) as defined herein may be ultimately delivered to its intended destination within a row via either a seeding, fertilizing, spraying and/or chemical element.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. A variable rate control system for dispensing or applying at least one agricultural product comprising:
    a prime mover for movement across the ground at a desired and known rate of travel, the prime mover having a prime mover hydraulic system with a corresponding prime mover hydraulic flow rate;
    an agricultural implement operatively attached to the prime mover and comprising a transport structure and a toolbar mounted on the transport structure;
    a plurality of row units mounted on the tool bar, each one of the plurality of row units adapted to dispense and/or apply the at least one agricultural product at individual and controlled rates;
    at least one agricultural product storage container for storing the at least one agricultural product to be dispensed or applied in operative communication with the plurality of row units, wherein the at least one agricultural product is in the group consisting of at least one type of agricultural seed for dispensation, at least one granular fertilizer for dispensation, and at least one type of liquid for application;
    a central controller in direct operative communication with each one of the plurality of row units; and
    a plurality of row unit control mechanisms mounted on the toolbar and in direct operative communication with the central controller, each one of the plurality of row unit control mechanisms being in further operative communication with, and independently controlling the operation of, one of the plurality of the row units, each one of the plurality of row unit control mechanisms comprising:
        a pulse width modulation valve connected with, and controlled by, the central controller,
        a hydraulic motor with integrated rpm reduction providing less than 1 gpm of hydraulic flow and connected to, and having a rotational speed that is controlled by the pulse width modulation valve, the hydraulic motor of each of the plurality of row unit control mechanisms in direct communication with the prime mover hydraulic system, and
        a speed sensor in operative communication with the central controller for communicating the hydraulic motor's rotational speed to the central controller;
        a rotatable stub drive shaft connected with the hydraulic motor; and
        an agricultural product metering assembly connected with the stub drive shaft and comprising a seed tube connected with the at least one agricultural product storage container, a seed tube sensor adapted to provide seed dispensation data to the central controller, a liquid agricultural product control valve controlled by the central controller and a liquid agricultural product flow meter adapted to monitor liquid agricultural product application and for providing liquid agricultural product application data to the central controller, whereby the controlled rotational speed of the rotatable stub drive shaft controls the frequency of dispensation or application of the at least one agricultural product.

2. The system of claim 1, wherein the unit row control mechanisms are GPS controlled.

3. The system of claim 2, further comprising a computerized pre-programmed map to provide location information to the central controller and to allow customized individual control of the individual row units according to position and forward speed.

4. The system of claim 2, further comprising individual control of the unit row control mechanisms according to GPS coordinates.

5. The system of claim 3, further comprising individual control of the unit row control mechanisms according to GPS coordinates.

6. The system of claim 1, further comprising the hydraulic motor with integrated rpm reduction providing between about 0.5 and about 1 gpm of hydraulic flow.

7. The system of claim 4, further comprising the hydraulic motor with integrated rpm reduction providing between about 0.5 and about 1 gpm of hydraulic flow.

8. A device for controlling rate and type of seed dispensation and liquid agricultural product from an agricultural implement operatively attached to the prime mover and a prime mover hydraulic system with a corresponding prime mover hydraulic flow rate, and having a transport structure and a toolbar mounted on the transport structure, comprising:
    a plurality of row units mounted on the toolbar, each one of the plurality of row units adapted to dispense and/or apply the at least one agricultural product at individual and controlled rates;
    at least one agricultural product storage container for storing the at least one agricultural product to be dispensed or applied in operative communication with the plurality of row units, wherein the at least one agricultural product is in the group consisting of at least one type of agricultural seed for dispensation, at least one granular fertilizer for dispensation, and at least one type of liquid for application;
    a central controller in direct operative communication with each one of the plurality of row units; and
    a plurality of row unit control mechanisms mounted on the toolbar and in direct operative communication with the central controller, each one of the plurality of row unit control mechanisms being in further operative communication with, and independently controlling the operation of, one of the plurality of the row units, each one of the plurality of row unit control mechanisms comprising:

a pulse width modulation valve connected with, and controlled by, the central controller, a hydraulic motor with integrated rpm reduction providing less than 1 gpm of hydraulic flow and connected to, and having a rotational speed that is controlled by, the pulse width modulation valve, the hydraulic motor of each of the plurality of row unit control mechanisms in direct communication with the prime mover hydraulic system, and a speed sensor in operative communication with the central controller for communicating the hydraulic motor's rotational speed to the central controller;

a rotatable stub drive shaft connected with the hydraulic motor; and an agricultural product metering assembly connected with the stub drive shaft and comprising a seed tube connected with the at least one agricultural product storage container, a seed tube sensor adapted to provide seed dispensation data to the central controller, a liquid agricultural product control valve controlled by the central controller and a liquid agricultural product flow meter adapted to monitor liquid agricultural product application and for providing liquid agricultural product application data to the central controller, whereby the controlled rotational speed of the rotatable stub drive shaft controls the frequency of dispensation or application of the at least one agricultural product.

9. The device of claim 8, wherein the unit row control mechanisms are GPS controlled.

10. The device of claim 9, further comprising a computerized pre-programmed map to provide location information to the central controller and to allow customized individual control of the individual row units according to position and forward speed.

11. The device of claim 9, further comprising individual control of the unit row control mechanisms according to GPS coordinates.

12. The device of claim 10, further comprising individual control of the unit row control mechanisms according to GPS coordinates.

13. The device of claim 8, further comprising the hydraulic motor with integrated rpm reduction providing between about 0.5 and about 1 gpm of hydraulic flow.

14. The device of claim 10, further comprising the hydraulic motor with integrated rpm reduction providing between about 0.5 and about 1 gpm of hydraulic flow.

15. A method for controlling rate and type of seed dispensation and liquid agricultural product from an agricultural implement operatively attached to the prime mover and having a transport structure and a toolbar mounted on the transport structure, comprising:

providing a plurality of row units mounted on the toolbar;

adapting each one of the plurality of row units to dispense the at least one agricultural product at individual and controlled rates;

providing at least one agricultural product storage container;

providing at least one agricultural product to be dispensed and/or applied, the agricultural product in the group consisting of at least one type of agricultural seed for dispensation, at least one granular fertilizer for dispensation, and at least one type of liquid for application;

storing the at least one agricultural product to be dispensed or applied within the at least one agricultural product storage container, wherein the at least one agricultural product includes at least one type of agricultural seed for dispensation and at least one type of liquid for application;

operatively connecting the at least one agricultural product storage container with the plurality of row units;

providing a central controller in direct operative communication with each one of the plurality of row units; and providing a plurality of row unit control mechanisms mounted on the toolbar and in direct operative communication with the central controller, each one of the plurality of row unit control mechanisms being in operative communication with, and independently controlling the operation of, one of the plurality of the row unit, each row unit control mechanism comprising:

a pulse width modulation valve connected with, and controlled by, the central controller, a hydraulic motor with integrated rpm reduction providing less than 1 gpm of hydraulic flow and connected to, and having a rotational speed that is controlled by, the pulse width modulation valve, the hydraulic motor of each of the plurality of row unit control mechanisms is configured for direct communication with a prime mover hydraulic system, and a speed sensor in operative communication with the central controller for communicating the hydraulic motor's rotational speed to the central controller;

a rotatable stub drive shaft connected with the hydraulic motor; and an agricultural product metering assembly connected with the stub drive shaft and comprising a seed tube connected with the at least one agricultural product storage container, a seed tube sensor providing seed dispensation data to the central controller, a liquid agricultural product control valve controlled by the central controller and a liquid agricultural product flow meter monitoring liquid agricultural product application and for providing liquid agricultural product application data to the central controller, whereby the controlled rotational speed of the rotatable stub drive shaft controls the frequency of dispensation or application of the at least one agricultural product.

16. The method of claim 15, wherein the unit row control mechanisms are GPS controlled.

17. The method of claim 16, further comprising a computerized pre-programmed map to provide location information to the central controller and to allow customized individual control of the individual row units according to position and forward speed.

18. The method of claim 16, further comprising individual control of the unit row control mechanisms according to GPS coordinates.

19. The method of claim 17, further comprising individual control of the unit row control mechanisms according to GPS coordinates.

20. The method of claim 15, further comprising the hydraulic motor with integrated rpm reduction providing between about 0.5 and about 1 gpm of hydraulic flow.

21. The method of claim 17, further comprising the hydraulic motor with integrated rpm reduction providing between about 0.5 and about 1 gpm of hydraulic flow.

* * * * *